United States Patent
Son

(10) Patent No.: US 9,935,325 B2
(45) Date of Patent: Apr. 3, 2018

(54) METHOD FOR CONTROLLING OPERATION PRESSURE OF FUEL CELL SYSTEM

(71) Applicant: Hyundai Motor Company, Seoul (KR)

(72) Inventor: Ik Jae Son, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 68 days.

(21) Appl. No.: 14/960,355

(22) Filed: Dec. 5, 2015

(65) Prior Publication Data
US 2016/0380293 A1 Dec. 29, 2016

(30) Foreign Application Priority Data
Jun. 26, 2015 (KR) .................. 10-2015-0090846

(51) Int. Cl.
*H01M 8/0438* (2016.01)
*H01M 8/04746* (2016.01)

(52) U.S. Cl.
CPC ..... *H01M 8/04783* (2013.01); *H01M 8/0438* (2013.01); *H01M 2250/20* (2013.01); *Y02T 90/32* (2013.01)

(58) Field of Classification Search
CPC ................................ H01M 8/04783
See application file for complete search history.

(56) References Cited

U.S. PATENT DOCUMENTS

2007/0287044 A1* 12/2007 Arthur ............. H01M 8/04097
429/415

FOREIGN PATENT DOCUMENTS

| JP | 2004-342473 A | 12/2004 |
| JP | 2006-339080 A | 12/2006 |
| JP | 2007-294116 A | 11/2007 |
| JP | 2011-076816 A | 4/2011 |
| JP | 2014-038703 A | 2/2014 |

* cited by examiner

*Primary Examiner* — Jonathan G Leong
*Assistant Examiner* — Christopher P Domone
(74) *Attorney, Agent, or Firm* — Mintz Levin Cohn Ferris Glovsky and Popeo, P.C.; Peter F. Corless

(57) ABSTRACT

A control method of an operation pressure of a fuel cell system maintains a differential pressure between a hydrogen side and an air side of a fuel cell stack to minimize a crossover amount of hydrogen while allowing hydrogen purge and reduces an exhausted hydrogen amount when a purge valve is opened at the time of purging hydrogen using a differential pressure of an anode outlet and a cathode outlet to improve a hydrogen utilization rate and system efficiency. According to the control method, pressures of a cathode inlet and a cathode outlet of the fuel cell stack and a pressure of an anode outlet are controlled such that the pressure of the anode outlet of the fuel cell stack is lower than the pressure of the cathode inlet and higher than the pressure of the cathode outlet.

8 Claims, 3 Drawing Sheets

METHOD FOR CONTROLLING OPERATION PRESSURE OF FUEL CELL SYSTEM

CROSS-REFERENCE TO RELATED APPLICATION

This application claims under 35 U.S.C. § 119(a) the benefit of Korean Patent Application No. 10-2015-0090846 filed on Jun. 26, 2015, the entire contents of which are incorporated herein by reference.

BACKGROUND (a) Technical Field

The present invention relates to a control method of a fuel cell system, more particularly to an operation pressure control method of a fuel cell system which appropriately maintains a differential pressure between hydrogen and air of a fuel cell stack to minimize a crossover amount of hydrogen, and reduces a hydrogen discharge amount at the time of purging hydrogen using a differential pressure between an anode outlet and a cathode outlet to improve a hydrogen utilization rate and system efficiency.

(b) Description of the Related Art

A fuel cell is an energy converting device which electrochemically reacts chemical energy of a fuel to be converted into electric energy without burning the chemical energy to be converted into heat, and which may be used not only to supply power for an industrial purpose, a domestic purpose, and a vehicle, but also to supply power of a small-size electric/electronic product or mobile equipment.

Conventionally, as a fuel cell for a vehicle, a polymer electrolyte membrane fuel cell (PEMFC) having a high power density has been utilized.

In the PEMFC, a membrane-electrode assembly (MEA) is located in an innermost part, and the MEA is configured by a solid polymer electrolyte membrane that may move a hydrogen ion and a cathode and an anode, which are electrode layers applied with a catalyst, on both surfaces of the electrolyte membrane so that hydrogen and oxygen react therewith.

On an outer part of the MEA, that is, on an outer part where the cathode and the anode are located, a gas diffusion layer (GDL) is laminated and a bipolar plate which supplies a reactant gas (hydrogen which is fuel gas and oxygen or air which is an oxidizer gas) and has a flow field through which a coolant passes is located on an outer part of the GDL.

A gasket for sealing fluid is laminated to be interposed between bipolar plates, after laminating a plurality of cells with the configuration as a unit cell, end plates are coupled to the outermost parts to support the cells, and the cells are arranged to be engaged with each other between the end plates to form a fuel cell stack.

Since each unit cell maintains low voltage at the time of operation, in order to increase voltage, several tens to several hundreds of cells are laminated in series to form a stack and then be used as an electricity generating device.

A fuel cell system which is applied to a fuel cell vehicle is configured by the above-described fuel cell stack and devices for supplying a reactant gas. FIG. 1 illustrates a diagram illustrating a fuel cell system.

As shown in FIG. 1, the fuel cell system includes a fuel cell stack 10 which generates electric energy from an electric chemical reaction of a reactant gas, a hydrogen supply device 20 which supplies hydrogen, which is a fuel, to the fuel cell stack 10, an air supply device 30 which supplies air containing oxygen to the fuel cell stack 10, a heat and water management system 40 which controls an operating temperature of the fuel cell stack 10 and manages water, and a fuel cell system controller (not illustrated) which controls an overall operation of the fuel cell system.

The hydrogen supply device 20 of a normal fuel cell system includes a hydrogen storage unit (hydrogen tank, not illustrated), a regulator (not illustrated), a hydrogen pressure adjusting valve 21, and a hydrogen recycling device 22, the air supply device 30 includes an air blower (atmospheric pressure type) or an air compressor (pressurized type) 32 and a humidifier 33, and the heat and water management system includes a water trap 41, an electro-motion water pump (a coolant pump), a water tank, and a radiator which are not illustrated.

A high pressure of hydrogen which is supplied from the hydrogen supply device 20 to the hydrogen tank is reduced to a predetermined pressure in the regulator and then the hydrogen is supplied to the fuel cell stack 10. In this case, the hydrogen having a reduced pressure is supplied to the fuel cell stack with a controlled supply amount through pressure control in accordance with an operating condition of the fuel cell stack.

That is, the pressure of the hydrogen which goes through the regulator from the hydrogen tank is adjusted by the hydrogen pressure adjusting valve 21 at an inlet of the anode of the stack, and then the hydrogen is supplied to the fuel cell stack 10. The hydrogen pressure adjusting valve 21 is controlled to adjust the pressure of the hydrogen which is reduced by the regulator to be an appropriate pressure in accordance with the stack operating condition. In this case, the controller receives values of two hydrogen pressure sensors 25 and 26 which are provided at the inlet and outlet of the anode of the stack to control the hydrogen pressure adjusting valve 21.

The hydrogen which remains in the fuel cell stack 10 after reaction is discharged through the outlet of the anode (anode) of the stack or recycled to the inlet of the anode of the stack by the hydrogen recycling device 22.

The hydrogen recycling device 22 is a device which increases reliability of supplying hydrogen and improves a life span of the fuel cell. There are several recycling methods and a method using an ejector 23, a method using a blower, and a method using both the ejector and the blower are known.

The hydrogen recycling device 22 recycles unreacted hydrogen which remains after being used in the anode (anode) of the fuel cell stack 10 back to the anode through a recycling pipe 24, thereby trying to reuse the hydrogen.

In the fuel cell, as foreign substances such as nitrogen, water, and moisture which is transferred to the anode through an electrode membrane in the stack are increased, the amount of hydrogen in the anode is reduced, so that reaction efficiency is lowered and thus the purge valve 27 is opened in accordance with a predetermined cycle to purge the hydrogen.

That is, the purge valve 27 for purging hydrogen is provided at the outlet side pipe of the anode of the fuel cell stack 10 to periodically discharge the hydrogen in the anode, to discharge and remove the foreign substance such as nitrogen or water from the fuel cell stack and increase a hydrogen utilization rate.

As described above, when the foreign substance in the fuel cell stack is discharged, there are advantages of an increased hydrogen concentration, an increased hydrogen utilization rate, and improved gas diffusion degree and reactivity.

A method of operating a fuel cell system is mainly divided into an atmospheric pressure type and a pressurized type, and an operation pressure of the fuel cell stack in each operating method acts as one of the factors that affects performance.

The atmospheric pressure type fuel cell system generally uses an air blower to supply atmospheric pressure air to the cathode of the stack, and the pressurized type fuel cell system uses an air compressor 32 to supply air having a higher pressure than the atmospheric pressure to the cathode of the stack.

The pressurized type fuel cell system supplies air which passes through a filter 31 to the cathode of the fuel cell stack 10 using the air compressor 32 and controls a pressure of the outlet of the cathode using the air pressure adjusting valve 34 which is mounted in the outlet side pipe of the cathode of the stack.

In the meantime, the hydrogen purge which is periodically performed on the anode using the purge valve 27 is performed using a differential pressure between the hydrogen side and the air side in order to improve hydrogen concentration in the fuel cell system.

In this case, as the differential pressure is increased, an amount of hydrogen which is crossed-over from the anode to the cathode through the MEA in the fuel cell stack in the normal driving section is increased, which lowers the utilization rate of the hydrogen.

Therefore, an operating technique which minimizes a hydrogen cross-over amount while allowing the hydrogen purge by appropriately maintaining the differential pressure of the hydrogen side and the air side is required.

In the related art, the operation pressure at the hydrogen side is normally maintained to be higher than an operation pressure at the air side and in this case, hydrogen purge using an operation pressure difference between the anode outlet and the cathode outlet is allowed, which is advantageous to secure a stable system operation.

However, when the operation pressure is increased as illustrated in FIG. 2 (RELATED ART), due to the increase of air flow, the differential pressure between the anode outlet and the cathode outlet is increased, so that one purge flow of hydrogen when the purge valve is opened is gradually increased and the hydrogen operation pressure is raised, thereby gradually increasing an amount of hydrogen which is crossed-over from the anode to the cathode.

However, the increased hydrogen purge amount and the increased hydrogen cross-over amount may be major causes of lowering the hydrogen utilization rate and system efficiency.

Specifically, in the case of a pressurized operating system, the differential pressure between the anode outlet and the cathode outlet is further increased in accordance with increase of an operation pressure of a cathode inlet. Further, when the differential pressure between the cathode inlet and the cathode outlet is increased due to the system design change (for example, design change of a bipolar plate), the differential pressure between the anode outlet and the cathode outlet is further increased.

FIG. 2 illustrates an operation pressure control map of the related art in accordance with an air mass flow in which A (kPa) indicates a minimum operation pressure of an anode inlet and an anode outlet.

Generally, when a target air mass flow is determined in accordance with the fuel cell operating condition at the time of controlling the operation pressure of the fuel cell system, a controller determines target values of pressures of the anode inlet and the anode outlet and the cathode inlet and the cathode outlet corresponding to the target flow from the operation pressure control map and receives the measurement values of the hydrogen pressure sensors 25 and 26 and the air pressure sensors 35 and 36 to control the pressures of the anode inlet and outlet and the cathode inlet and the cathode outlet to be the target pressure values.

Here, the operation pressure of the fuel cell system is set in the map to be controlled such that the cathode inlet pressure is higher than the cathode outlet pressure, the hydrogen outlet pressure is higher than the cathode inlet pressure, and the anode inlet pressure is higher than the anode outlet pressure, as illustrated in FIG. 2.

Here, the excessive hydrogen operation pressure increases a hydrogen cross-over amount, which lowers the hydrogen utilization rate and the system efficiency.

When the differential pressure is excessively high to discharge a gas of the anode using a differential pressure between the anode outlet and the cathode outlet at the time of hydrogen purge, the discharge amount when the purge valve is opened one time is excessively large.

Therefore, it is required to improve an operating speed of the purge valve in order to reduce the discharge amount when the purge valve is opened one time, but this may cause the development cost to be increased.

The above information disclosed in this Background section is only for enhancement of understanding of the background of the invention and therefore it may contain information that does not form the prior art that is already known in this country to a person of ordinary skill in the art.

SUMMARY

The present invention provides an operation pressure control method of a fuel cell system which appropriately maintains a differential pressure between a hydrogen side and an air side of a fuel cell stack to minimize a crossover amount of the hydrogen while allowing hydrogen purge and reduces a hydrogen discharge amount at the time of opening a purge valve one time in hydrogen purge using a differential pressure between an anode outlet and a cathode outlet to improve a hydrogen utilization rate and system efficiency.

In one aspect, the present invention provides an operation pressure control method of a fuel cell system in which when a fuel cell system operates, pressures of a cathode inlet and a cathode outlet of a fuel cell stack and a pressure of an anode outlet are controlled such that the pressure of the anode outlet of the fuel cell stack is lower than the pressure of the cathode inlet and higher than the pressure of the cathode outlet.

In a preferred embodiment, the fuel cell system may be a pressurized type fuel cell system which supplies air which is an oxidizer gas to the fuel cell stack using an air compressor.

In another preferred embodiment, when the fuel cell system operates, a minimum operation pressure of the pressure of the anode inlet and the pressure of the anode outlet may vary to be a value determined by an atmospheric pressure detected by an atmospheric pressure sensor of a vehicle.

In still another preferred embodiment, the minimum operation pressure may be determined to be a lower value as the atmospheric pressure is low.

In yet another preferred embodiment, when a target air mass flow is determined in accordance with the fuel cell operating condition, target values of the pressures of the cathode inlet and the cathode outlet of the fuel cell stack and the pressure of the anode outlet corresponding to the target flow may be determined from the operation pressure control map and the pressures of the cathode inlet and the cathode outlet of the fuel cell stack and the pressure of the anode outlet may be controlled in accordance with the determined target pressure value.

In still yet another preferred embodiment, in order to control the pressures of the anode inlet and the anode outlet of the fuel cell stack to be the target pressure values in accordance with the fuel cell operating condition, measurement values of hydrogen pressure sensors provided in the anode inlet and the anode outlet may be fed back to control the hydrogen pressure adjusting valve of the anode inlet.

In a further preferred embodiment, in order to control the pressures of the cathode inlet and the cathode outlet of the fuel cell stack to be the target pressure values in accordance with the fuel cell operating condition, measurement values of air pressure sensors provided in the cathode inlet and the cathode outlet may be fedback to control an air compressor which supplies the air to the fuel cell stack and an air pressure adjusting valve of the cathode outlet.

Further, according to the present invention, an operation pressure control method of a fuel cell system includes the step of: controlling pressures of a cathode inlet and a cathode outlet of a fuel cell stack and a pressure of an anode outlet such that the pressure of the anode outlet of the fuel cell stack is lower than the pressure of the cathode inlet and higher than the pressure of the cathode outlet.

Therefore, according to the operation pressure control method of a fuel cell system according to the present invention, when the operation pressures of the hydrogen side and the air side of the fuel cell are controlled at the time of operating the fuel cell system, the pressure of the anode outlet is controlled to be lower than the pressure of the cathode inlet and higher than the pressure of the cathode outlet, so that a differential pressure between the hydrogen side operation pressure and the air side operation pressure is reduced to allow the hydrogen purge, and thus the hydrogen cross-over amount may be minimized when the differential pressure is reduced.

The hydrogen discharge amount when the purge valve is opened one time is reduced during the hydrogen purge using the differential pressure between the anode outlet and the cathode outlet and thus an opening time of the purge valve is increased, thereby easily controlling the purge valve and reducing development cost required to improve an operating speed of the purge valve.

As a result, the hydrogen utilization rate and the system efficiency may be improved.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
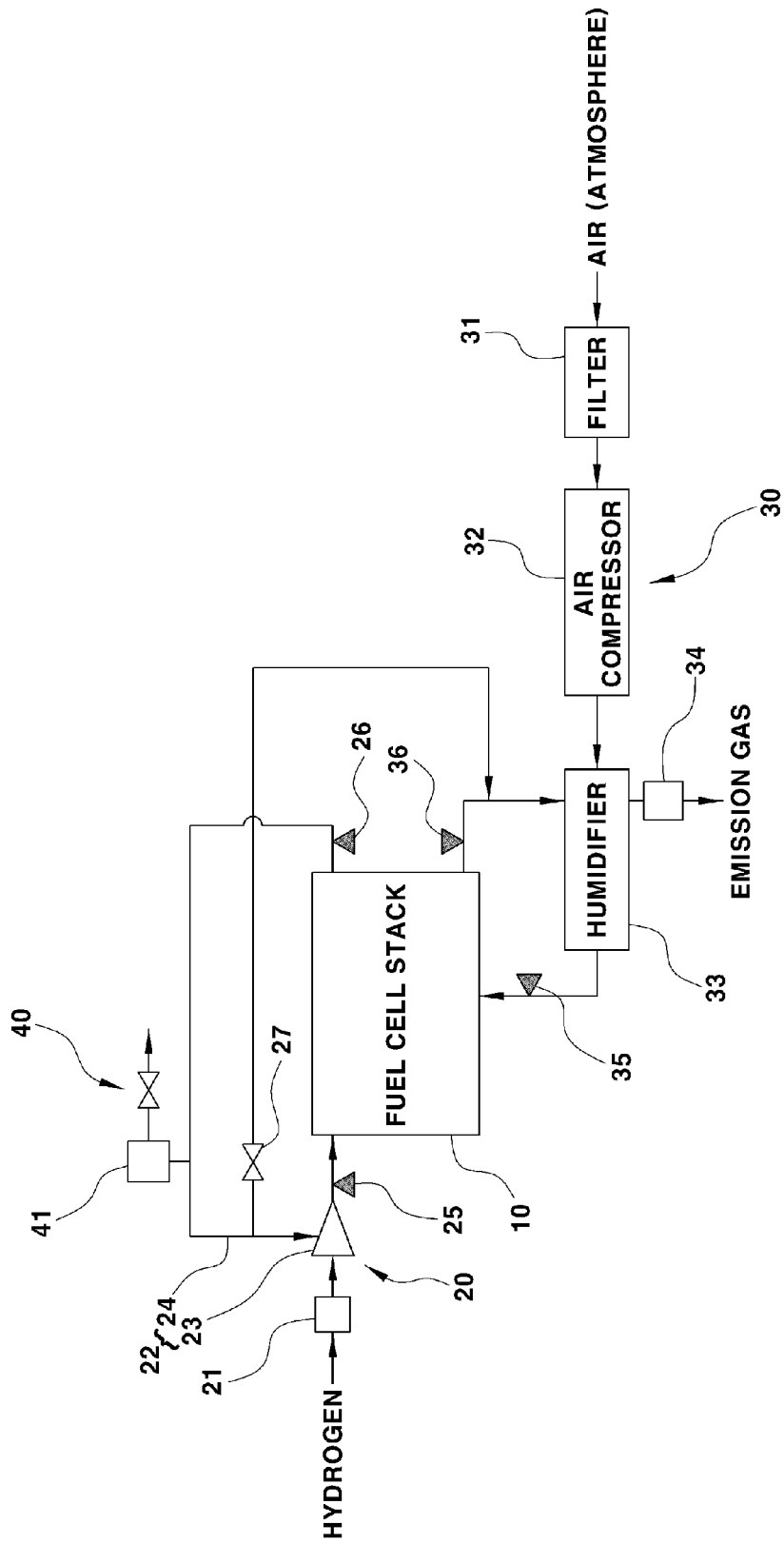
FIG. 1 (RELATED ART) is a diagram illustrating a pressurized type fuel cell system of the related art.
Figure 2:
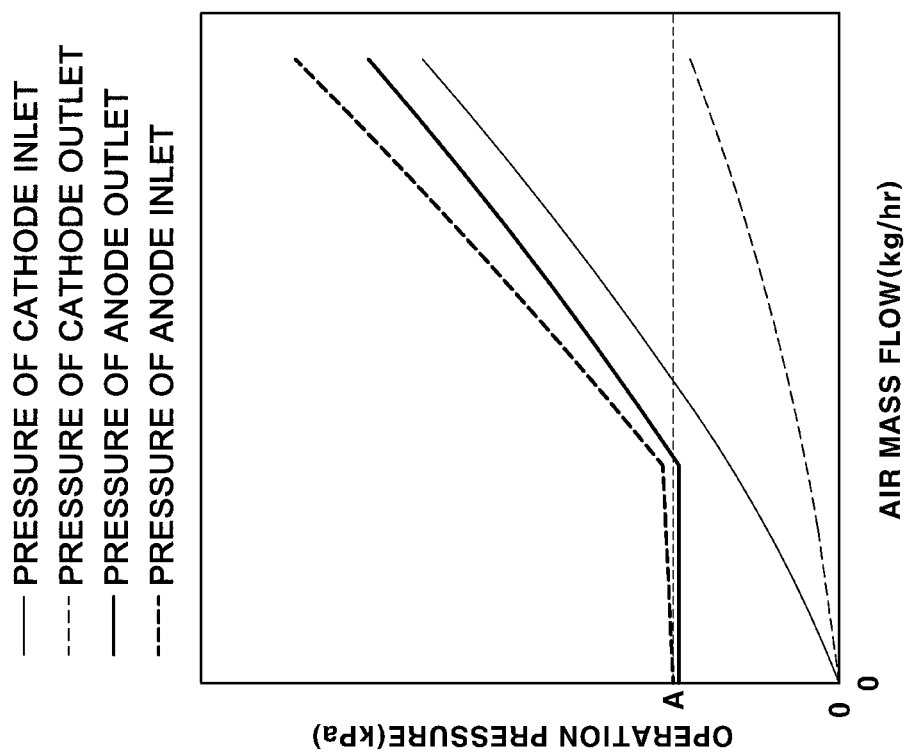
FIG. 2 (RELATED ART) is a view illustrating an operation pressure control map of the related art in accordance with an air mass flow.

Reference numerals set forth in the Drawings includes reference to the following elements as further discussed below.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiment of the present invention will be described more fully with reference to the accompanying drawings, so as to be easily carried out by those skilled in the art.

The present invention relates to a method of controlling an operation pressure of a fuel cell system which appropriately maintains a differential pressure between a hydrogen side and an air side of a fuel cell stack to minimize a hydrogen cross-over amount to a cathode through MEA in the fuel cell stack while allowing the hydrogen purge to improve a hydrogen utilization rate and system efficiency.

Specifically, the present invention is focused on reducing a difference between a hydrogen side operation pressure and an air side operation pressure of the fuel cell stack within a range in which the hydrogen purge by the purge valve is allowed to minimize a hydrogen cross-over amount and a hydrogen discharge amount when the purge valve is opened one time.

Figure 3:
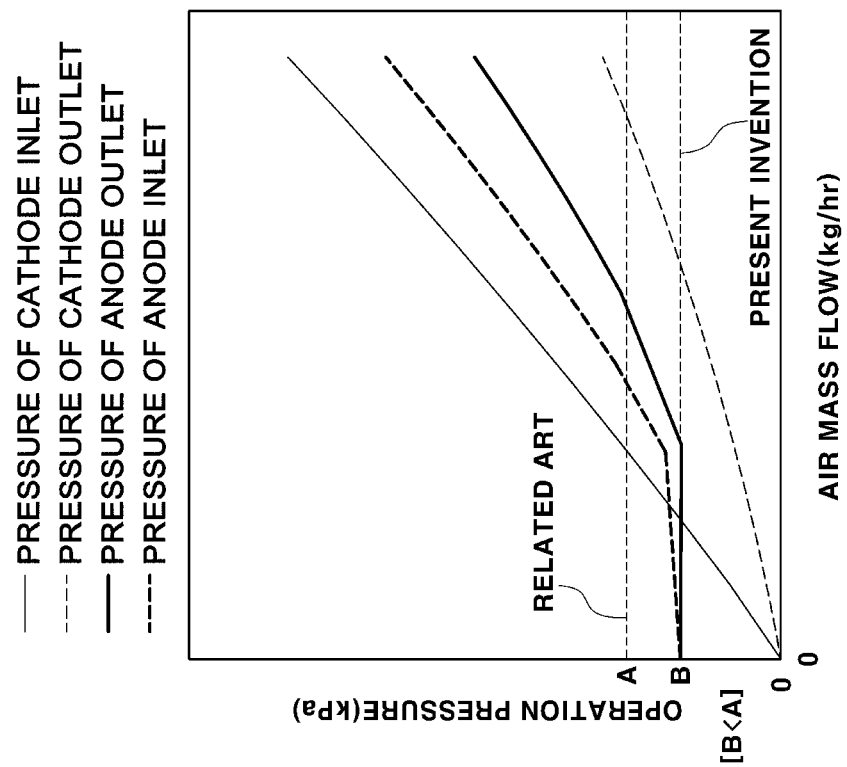
FIG. 3 is a view illustrating an operation pressure control map in accordance with an air mass flow which may be applied to a control method of the present invention.

FIG. 3 is a view illustrating an operation pressure control map in accordance with an air mass flow which may be applied to a control method of the present invention.

First, the control method of the present invention is applied to a pressurized type fuel cell system which is a variable pressure system whose operation pressure is variably controlled, and FIG. 1 illustrates a pressurized type fuel cell system.

Hereinafter, a configuration of a system will be described with reference to FIG. 1 in description of the control method of the present invention.

Generally, in the pressurized type fuel cell system, an air compressor 32 is used to supply air having pressure which is higher than atmospheric pressure, which is different from an atmospheric pressure type using an air blower, and an air pressure adjusting valve 34 is provided in a pipe of a cathode outlet of the fuel cell stack 10.

In this case, the air pressure adjusting valve 34 may be provided at a rear end of the humidifier 33, in the pipe of the cathode outlet.

Accordingly, after exchanging moisture of moist air discharged through the cathode outlet of the fuel cell stack 10 with dry air which is supplied by the air compressor 32 while passing though the humidifier 33, the moist air is emitted to the atmosphere through the air pressure adjusting valve 34.

The pipe of the anode outlet of the fuel cell stack 10 in which the purge valve 27 is provided is connected to the pipe of the cathode outlet, so that when hydrogen containing an emission gas which is discharged from the anode of the fuel cell stack 10, that is, foreign substances such as nitrogen and water is purged, the hydrogen moves to the pipe of the cathode outlet through the purge valve 27 to be diluted with moist air which is discharged through the cathode outlet.

In this case, the hydrogen purge is performed by the differential pressure between the anode outlet and the cathode outlet when the purge valve is opened.

In the present invention, the operation pressure of the fuel cell system is set in the operation control map to be controlled such that the pressure of the anode outlet of the fuel cell stack 10 is lower than the pressure of the cathode inlet and is higher than the pressure of the cathode outlet, as illustrated in FIG. 3.

As described above, the pressure of the anode outlet is controlled to be lower than the pressure of the cathode inlet, so that the operation pressure of the hydrogen side is lowered, thereby minimizing an amount of hydrogen which is crossed-over from the anode to the cathode due to the reduced differential pressure between the anode side and the cathode side in accordance with the reduced operation pressure of the hydrogen side in an entire reactive area of the MEA in the fuel cell stack.

As described above, since the hydrogen is purged by the differential pressure between the anode outlet and the cathode outlet, the differential pressure between the anode outlet and the cathode outlet may be within a range where the hydrogen may be purged when the purge valve is opened.

Therefore, in the operation pressure control map of FIG. 3, the pressure of the anode outlet is set to be lower than the pressure of the cathode inlet, but the difference from the pressure of the cathode outlet is set to be within a range where the hydrogen may be purged.

As described above, when the differential pressure between the pressure of the anode outlet and the pressure of the cathode outlet is reduced by lowering the pressure of the anode outlet within the range where the hydrogen may be purged, the hydrogen emission when the purge valve is opened one time may be minimized.

As a result, the differential pressure between the hydrogen side pressure and the air side pressure of the fuel cell stack 10 is reduced within the range where the hydrogen may be purged by the purge valve 27, so that the object of the present invention which minimizes the hydrogen cross-over amount and the hydrogen emission amount when the purge valve is opened one time may be achieved.

Since the hydrogen emission amount when the purge valve is opened one time is reduced, the open time of the purge valve is increased. Therefore, the purge valve may be easily controlled, and a development cost required to improve the operating speed of the purge valve may be reduced.

In the meantime, when the operation pressure of the fuel cell system is controlled, the pressure of the anode inlet is adjusted by the hydrogen pressure adjusting valve 21 and a high pressure of hydrogen supplied from a hydrogen tank is reduced in the regulator to be a predetermined pressure and then the hydrogen is supplied to the fuel cell stack with a supply amount which is controlled by adjusting the pressure by the hydrogen pressure adjusting valve.

In this case, a controller (not illustrated) controls the hydrogen pressure adjusting valve 21 to adjust pressures of the anode inlet and the anode outlet. When a target air mass flow is determined in accordance with the fuel cell operating condition, the controller controls the hydrogen pressure adjusting valve 21 by receiving the measurement values of the hydrogen pressure sensors 25 and 26 with the pressure value (the pressure value of the anode inlet on the map) on the operation pressure control map corresponding to the target flow as a target value, thereby adjusting the pressures of the anode inlet and the anode outlet.

When the pressure of the anode inlet is adjusted by the hydrogen pressure adjusting valve 21, the pressure of the anode outlet is adjusted in accordance with the adjusted pressure of the anode inlet. In this case, the adjusted pressure of the anode outlet indicates a differential pressure from the pressure of the anode inlet in accordance with the pressure state of the anode inlet and a design specification of a bipolar plate of the stack.

As described above, the differential pressure between the pressure of the anode inlet and the pressure of the anode outlet may vary in accordance with the design specification of the bipolar plate of the stack and also vary in accordance with the pressure of the anode inlet. As illustrated in FIG. 3, as the pressure of the anode inlet is large, the differential pressure is large.

In summary, the pressure of the anode inlet is adjusted and the pressure of the anode outlet which varies depending on the pressure of the anode inlet is also adjusted by the hydrogen pressure adjusting valve 21.

The pressure of the cathode inlet and the pressure of the cathode outlet are adjusted by controlling a rotation speed of the air compressor 32 and an open amount of the air pressure adjusting valve 34.

That is, the controller controls the air compressor 32 and the air pressure adjusting valve 34 to be driven with the pressure value (pressures of the cathode inlet and the cathode outlet in accordance with an air mass flow on the map) of the operation pressure control map as a target value to control the pressure of the cathode inlet and the pressure of the cathode outlet, and the pressure of the cathode inlet and the pressure of the cathode outlet are controlled, so that the air mass flow is controlled.

In this case, when the target air mass flow is determined in accordance with the operating condition of the fuel cell, the controller determines the target pressure value corresponding to a target flow using the operation pressure control map and then receives the measurement values of the air pressure sensors 35 and 36 which are provided in the cathode inlet and the cathode outlet of the stack 10 as a feedback to control the pressure of the cathode inlet and the pressure of the cathode outlet to be the target pressure values.

In the meantime, even though the pressure of the cathode inlet is set to be higher than the pressure of the anode inlet in the operation pressure control map of FIG. 3, there may be a region where the pressure of the cathode inlet is lower than the pressure of the anode inlet in accordance with the operating condition of the fuel cell.

When the pressure of the anode outlet is controlled to be lower than the pressure of the cathode inlet and the pressure of the cathode inlet is controlled to be higher than the pressure of the anode inlet as illustrated in FIG. 3, there is a condition where nitrogen of the cathode crosses-over the anode, that is, a section where the air operation pressure is higher than a hydrogen operation pressure. However, since a nitrogen cross-over amount (crossed-over from the cathode to the anode) is absolutely smaller than the hydrogen cross-over amount (crossed-over from the anode to the cathode), it is advantageous to reduce the hydrogen cross-over amount by increasing the air operation pressure to be higher than the hydrogen operation pressure as described in the present invention.

The operation pressure control map of FIG. 3 illustrates that the pressures of the cathode inlet and the cathode outlet and the pressures of the anode inlet and the anode outlet are set as the target operation pressures in accordance with the air mass flow. However, when it is applied to a pressurized type fuel cell system which is a variable pressure system, the target operation pressure may be variably controlled in accordance with an operation temperature of the fuel cell stack or a state (wet or dry state) of the fuel cell stack. In this case, the operation temperature is also applied as a control variable together with the air mass flow so that the operation pressure control map may be a three-dimensional map.

As described above, after the operation pressure control value with the additional fuel cell operating condition as a control variable in addition to the air mass flow is set and mapped, when the created operation pressure control map is applied to the fuel cell system controller, the fuel cell system may be controlled to be driven to increase the hydrogen utilization rate and the system efficiency for the normal operating section.

In FIG. 3, B (kPa) indicates a minimum operation pressure of the pressure of the anode inlet and the pressure of the anode outlet and the minimum operation pressure B (kPa) of the present invention is set to be lower than a minimum operation pressure A (kPa) of the related art (i.e., B<A).

In the exemplary embodiment, the minimum operation pressure may vary in accordance with a signal value of the atmospheric pressure sensor which is mounted in the vehicle, that is, an atmospheric pressure detected by the atmospheric pressure sensor. As the atmospheric pressure detected by the atmospheric pressure sensor is low, a lower minimum operation pressure may be applied.

To this end, a plurality of operation pressure control maps which have different minimum operation pressures in accordance with the atmospheric pressure are stored in the controller and an operation pressure control map within the atmospheric pressure range to which the atmospheric pressure detected by the atmospheric pressure sensor belongs is selected to be used when the fuel cell system operates.

When the control method of the present invention is applied to a pressurized type fuel cell system, that is, a variable pressure system, the present invention may have an advantage in which an average operation pressure of the fuel cell is increased in accordance with the characteristic of the variable pressure system.

When the control method of the present invention which controls the pressure of the anode outlet to be lower than the pressure of the cathode inlet is applied, an absolute operation pressure increase due to the operation by the variable pressure and an increase in differential pressure between the pressure of the cathode inlet and the pressure of the cathode outlet due to the design change of the stack bipolar plate are advantageous to improve the hydrogen utilization rate.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An operation pressure control method of a fuel cell system, wherein when the fuel cell system operates, pressures of a cathode inlet and a cathode outlet of a fuel cell stack and a pressure of an anode outlet are controlled such that the pressure of the anode outlet of the fuel cell stack is lower than the pressure of the cathode inlet and higher than the pressure of the cathode outlet.

2. The control method of claim 1, wherein the fuel cell system is a pressurized type fuel cell system which supplies air which is an oxidizer gas to the fuel cell stack using an air compressor.

3. The control method of claim 1, wherein when the fuel cell system operates, a minimum operation pressure of the pressure of the anode inlet and the pressure of the anode outlet varies to be a value determined by an atmospheric pressure detected by an atmospheric pressure sensor of a vehicle.

4. The control method of claim 3, wherein the minimum operation pressure is determined to be a lowest value in accordance with when the atmospheric pressure has a lowest value.

5. The control method of claim 1, wherein when a target air mass flow is determined in accordance with a fuel cell operating condition, target values of the pressures of the cathode inlet and the cathode outlet of the fuel cell stack and the pressure of the anode outlet corresponding to a target flow are determined from an operation pressure control map and the pressures of the cathode inlet and the cathode outlet of the fuel cell stack and the pressure of the anode outlet are controlled in accordance with the determined target pressure value.

6. The control method of claim 1, wherein in order to control the pressures of an anode inlet and the anode outlet of the fuel cell stack to be target pressure values in accordance with a fuel cell operating condition, measurement values of hydrogen pressure sensors provided in the anode inlet and the anode outlet are fed back to control a hydrogen pressure adjusting valve of the anode inlet.

7. The control method of claim 1, wherein in order to control the pressures of the cathode inlet and the cathode outlet of the fuel cell stack to be target pressure values in accordance with a fuel cell operating condition, measurement values of air pressure sensors provided in the cathode inlet and the cathode outlet are fed back to control an air compressor which supplies air to the fuel cell stack and an air pressure adjusting valve of the cathode outlet.

8. An operation pressure control method of a fuel cell system, comprising the step of:
controlling pressures of a cathode inlet and a cathode outlet of a fuel cell stack and a pressure of an anode outlet such that the pressure of the anode outlet of the fuel cell stack is lower than the pressure of the cathode inlet and higher than the pressure of the cathode outlet.

* * * * *